INFORMATION STORAGE

Filed Aug. 25, 1964 2 Sheets-Sheet 1

INVENTOR.
JOSEPH R. BURNS
BY John V. Regan
ATTORNEY

INFORMATION STORAGE

Filed Aug. 25, 1964 2 Sheets-Sheet 2

INVENTOR.
JOSEPH R. BURNS
BY John V. Regan
Attorney

United States Patent Office 3,355,721

Patented Nov. 28, 1967

3,355,721

INFORMATION STORAGE

Joseph R. Burns, Trenton, N.J., assignor to Radio Corporation of America, a corporation of Delaware Filed Aug. 25, 1964, Ser. No. 391,980
26 Claims. (Cl. 340—173)

This invention relates to information storage and, in particular, to binary memory elements employing insulated-gate field-effect transistors and to memories employing such binary elements.

Ferrite cores are widely used as memory elements in digital computers because of their reliability and relatively small size and cost, and because they dissipate power only during read and write operations. The switching speed of a given core is a function of its physical size, the number of turns on the input winding linking the core, and the magnitude of the switching current flowing through the winding. When the size of the core is made smaller to achieve higher switching speed, it becomes more difficult and expensive to "thread" the necessary windings through the core's aperture. Also, the amplitude of the output, or sense, signal is reduced in value. For very small cores, the sense signal may be of the order of only a few millivolts or a few tens of millivolts, and the signal-to-noise ratio is very small. The small amplitude of the sense signals may involve the use of more complex and expensive amplifier arrangements for amplifying the small sense signals and distinguishing same from noise. The memory drivers and memory wiring techniques also are more complex because of the need to reduce noise, crosstalk, reflections and the like.

It is one object of this invention to provide an improved memory device that does not suffer the aforementioned disadvantages of very small cores.

It is another object of this invention to provide a novel memory device that can be manufactured in integrated form using known fabrication techniques.

It is still another object of this invention to provide novel memory devices that require very little standby power and that can be driven from decoders manufactured in integrated form, leading to the prospect of a complete system that can be manufactured in integrated form with only a relatively few processing steps.

It is a further object of this invention to provide a novel memory arrangement in which the memory elements comprise insulated-gate field-effect devices and in which the information stored in any selected one of a plurality of memory elements may be selectively sensed by means of a current response device connected in common to the plurality of elements.

It is yet another object of this invention to provide a novel memory device employing insulated-gate field-effect transistors connected in a complementary symmetry arrangement.

The memory element has first and second cross-coupled branch circuits each including the series combination of an n-type conductivity semiconductor device and a p-type conductivity semiconductor device having characteristics to be described. The control electrodes of the associated n- and p-type devices are connected together. Cross-coupling between the output of the second branch and the input of the first branch is by way of the conduction path of at least a first, normally "on" semiconductor device of one type conductivity. The conduction path of at least a second, normally "off" device of the opposite conductivity type is connected between the input of the first branch and an information input means. The memory device is interrogated by turning "off" the first device and turning "on" the second device at a time when no information input signal is present. New information is entered into the memory device through the conduction path of the second semiconductor device when the first and second devices are biased "off" and "on," respectively.

The state of the memory device may be sensed by connecting a current responsive device in series with a supply line common to the two branch circuits, and sensing for a change in current when the memory device is interrogated. In a memory arrangement comprising a group or array of individually addressable memory devices, the branch circuits of all of the memory devices in the group may be connected to a common current responsive device.

In the accompanying drawing, like reference characters denote like components, and:

Figure 1:
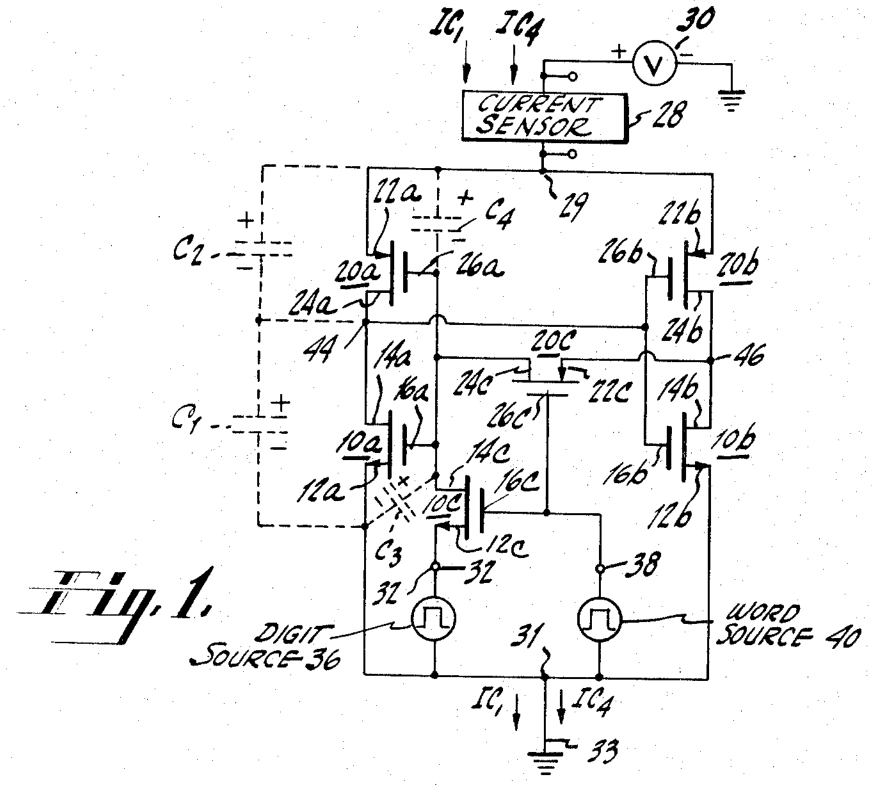
FIGURE 1 is a schematic diagram of a memory element embodying the invention and suitable for use in a word organized memory system.

The semiconductor devices contemplated for use in practicing the invention are ones having first and second electrodes defining the ends of a current carrying, or conduction, path and having a control electrode that conducts no current, or essentially no current, under steady state input conditions. Such electrodes often are referred to as source and drain, emitter and collector, etc. Each of the n-type devices has the characteristic that the impedance of its conduction path has a relatively high value when the voltage applied at its control electrode has a first relative value, and has a relatively low value when the voltage applied at its control electrode has a second relative value. The p-type device differs operationally from the n-type device in that the impedance of the conduction path in the p-type device has a relatively low value when the voltage applied at its control electrode has the first relative value, and has a relatively high value when the voltage at its control electrode has the second relative value. By way of example, the high impedance value may be of the order of a megohm or more, and the low impedance value may be of the order of a few kilohms or less. The ratio of the high to low impedance may be of the order of several hundred or more and, preferably, is at least a thousand, although it need not be that great.

Devices of the type known in the art as insulated-gate field-effect transistors have the aforementioned and other characteristics which render them preferred devices for use in practicing the invention. For this reason, the memory elements are illustrated in the drawing as employing insulated-gate field-effect transistors and will be so described hereinafter. However, other suitable devices may be employed.

An insulated-gate field-effect transistor may be defined generally as a majority carrier device that comprises a body of semiconductive material having a source and a drain in contact with the body and defining the ends of a conduction, or current carrying, path through the body. A gate (control) overlies at least a portion of the conduction path and is separated therefrom by an insulator or region of insulating material. Since the gate is insulated from the body of semiconductive material, it does not draw any current under steady state operating conditions, or at least it draws no appreciable current. The gate of one transistor may thus be connected directly to the drain of another transistor, and there is little or no steady state current flow through, or power dissipated in, the connection. Signals or voltages applied to the gate control the impedance of the conduction path.

Two known types of insulated-gate field-effect transistors are the thin-film transistor (TFT) and the metal-oxide semiconductor (MOS). Some of the physical and operating characteristics of a TFT are described in the article "The TFT—A New Thin-Film Transistor," by P. K. Weimer, appearing at pages 1462-1469 of the June, 1962 issue of the Proceedings of the IRE. The MOS transistor is described in an article entitled, "The Silicon Insulated-Gate Field-Effect Transistor," by S. R. Hofstein and F. P. Heiman, in the September, 1963 issue of the Proceedings of the IEEE at pages 1190–1202.

Insulated-gate field-effect transistors may be of either the enhancement type or the depletion type. The enhancement type unit is of particular interest in the present application. In an enhancement type unit, the conductivity of the conduction path is low and only a very small leakage current flows between source and drain when the gate and source have the same voltage. The transistor is biased "on" when the gate voltage differs from the source voltage in a specified polarity direction. The conductivity of the conduction path in an "on" transistor is a function of the voltage difference between source and gate.

A transistor may be either a p-type unit or an n-type unit, depending upon the conductivity type material of the semiconductor. A p-type unit is one in which the majority carriers are holes; in an n-type unit, the majority carriers are electrons. According to this definition, a p-type enhancement unit is one that has a relatively high conductivity conduction path when the gate voltage is negative relative to the source voltage; the n-type enhancement unit has a relatively high conductivity conduction path when its gate voltage is positive relative to its source voltage. A p-type unit is identified in the drawing by an arrowhead pointing toward the unit and located on the electrode that usually functions as the source electrode. As is known, a TFT or an MOS unit is bidirectional, and an electrode may function as the source electrode under one set of operating conditions, and may function as the drain electrode under other operating conditions in the same circuit. An n-type unit is identified in the drawing by an arrowhead pointing away from the unit.

In the memory element of FIGURE 1, a first insulated-gate field-effect transistor 10*a* of n-type conductivity has its source 12*a* connected to a point of reference potential, indicated by the conventional symbol for circuit ground, and has its drain 14*a* connected directly to the drain 24*a* of a second insulated-gate field-effect transistor 20*a* of p-type conductivity. A junction point 44 is common to the drain 14*a* and 24*a*. The source 22*a* of second transistor 20*a* is connected to a junction point 29. A current responsive device 28, to be described, is connected between junction point 29 and the positive terminal of a source 30 of V volts operating potential, which may be, for example, a battery, having its negative terminal grounded. In a like manner, the conduction paths of a third insulated-gate field-effect transistor 10*b* of n-type conductivity and a fourth insulated-gate field-effect transistor 20*b* of p-type conductivity are serially connected in a separate circuit branch between circuit ground and the junction point 29, whereby the current responsive device 28 is connected in the supply line common to the two circuit branches.

The gates 16*a*, 26*a* of the first and second transistors 10*a* and 20*a* are connected directly together by negligible impedance means, i.e., means offering negligible impedance. The gates 16*b*, 26*b* of the third and fourth transistors 10*b* and 20*b* also are connected together by negligible impedance means and are cross-coupled by negligible impedance means to the drains 14*a*, 24*a* of the first and second transistors 10*a* and 20*a*. A fifth insulated-gate field-effect transistor 20*c* of p-type conductivity has its conduction path connected in the cross-coupling path between the drains 14*b*, 24*b* of the third and fourth transistors 10*b* and 20*b* and the gates 16*a*, 26*a* of the first and second transistors 10*a* and 20*a*.

A sixth insulated-gate field-effect transistor 10*c* of n-type conductivity has its conduction path connected between an input terminal 32 and a point common to the gates 16*a*, 26*a* of the first and second transistors. Input signals from a first input source 36, labeled "Digit Source," are applied between input terminal 32 and circuit ground. The gates 16*c*, 26*c* of the fifth and sixth transistors 20*c* and 10*c* are connected in common to a second input terminal 38, and signals from a second signal source 40, labeled "Word Source," are applied between second input terminal 38 and circuit ground. The signal sources 36 and 40 normally supply voltages of ground potential at the first and second input terminals 32, 38 respectively, and are individually and selectively operable to switch the voltages at those terminals to +V volts, the same value as the voltage provided by the bias source 30.

As mentioned previously, the conductivity (inverse of resistance) of the conduction path in an enhancement type insulated-gate field-effect transistor is low when the gate and source have the same value of voltage. The transistor then is biased "off," and only a small leakage current flows between source and drain. When the gate voltage is more positive than the source voltage in an n-type unit, or more negative in a p-type unit, the transistor is biased "on," and the conductivity of the conduction path increases an amount determined by the difference in potential between gate and source. In the FIGURE 1 circuit, therefore, first transistor 10*a* is biased "on" and second transistor 20*a* is biased "off" when the voltage at gates 16*a* and 26*a* has a value of +V volts. The only steady state current flow through the transistors 10*a* and 20*a* for this condition is due to leakage current in second transistor 20*a*, and the value of this current may be of the order of only a few microamperes giving rise to only a very small steady state power dissipation. On the other hand, when the voltage applied at gates 16*a* and 26*a* is zero, first transistor 10*a* is biased "off" and second transistor 20*a* is biased "on." Only the leakage current for first transistor 10*a* flows through the transistors 10*a* and 20*a* for this steady state condition.

In either steady state condition, first and second transistors 10*a* and 20*a* function essentially as a voltage divider. When first transistor 10*a* is "on" and second transistor 20*a* is "off," the voltage at junction 44 is essentially zero due to the high impedance condition of second transistor 20*a* relative to the relatively low impedance of first transistor 10*a*. When first transistor 10*a* is "off" and second transistor 20*a* is "on," the voltage at junction 44 has a value of approximately +V volts. As will be described, the voltage at junction 46 is zero when the voltage at junction 44 is +V volts, and vice-versa. The state of the memory element could be sensed by sampling the voltage at either of the junctions 44 and 46 when a signal is applied tending to reset the memory element to a reference one of the two stable states. The disadvantage of such a sensing technique is that the voltage sensing device would have the effect of adding a large capacitance between either of the junctions 44 or 46 and circuit ground. This is especially true in the case of an array or group of memory elements all coupled to a common voltage sensing device. Since this large load capacitance would have to discharge and charge to the full V volts, the effect of the capacitance would be to slow down the switching speed of the memory element, and the memory cycle time. For the aforementioned reasons, it would be preferable to employ a current sensing technique to sense the state of the memory element or elements.

I have discovered that insulated-gate field-effect transistors have certain characteristics that may be taken advantage of to achieve current sensing of the memory elements when the transistors are connected in a complementary symmetry arrangement. An insulated-gate field-effect transistor has a first capacitance between its source and drain, a second capacitance between its gate and source, and some small capacitance between its gate and drain. In FIGURE 1, it can be seen that the capacitance between the gate **16*b* and source 12*b* of the third transistor 10*b* is in parallel with the capacitance across the drain 14*a* and source 12*a* of the first transistor 10*a*. The capacitor $C_1$, as shown in dotted lines, represents the sum of these two capacitances together with the capacitance of any load (not shown) that might be connected between junction 44 and ground, and any stray capacitance that may appear between these points. In like manner, capacitor $C_2$ represents the sum of the gate 26*b* to source 22*b* capacitance of fourth transistor 20*b*, the drain 24*a* to source 22*a* capacitance of second transistor 20*a*, and stray capacitance appearing between junctions 44 and 29. Capacitor $C_3$ represents the capacitance between source 12*a* and gate 16*a* of first transistor 10*a*, and capacitor $C_4$ represents the capacitance between source 22*a* and gate 26*a* of second transistor 20*a***.

When the memory element is switched to the reference state from the other stable state, the voltage at junction 44 changes value. As a result thereof, certain ones of the capacitances $C_1 \ldots C_4$ charge and others discharge, with the result that a transient current flows in the common path from voltage source 30 to junction point 29 and in the common connection from junction point 31 to circuit ground. This transient current may be sensed by the current responsive device 28 connected between junction 29 and the voltage source. Alternatively, the current sensor 28 may be connected in the common path between circuit ground and the sources **12*a* and 12*b* of the first and third transistors 10*a* and 10*b*. For example, the sensor 28 could be connected between junction 31** and ground. Details of the current sensing technique will be clearer from the following detailed discussion of the memory element's operation.

Figure 2:
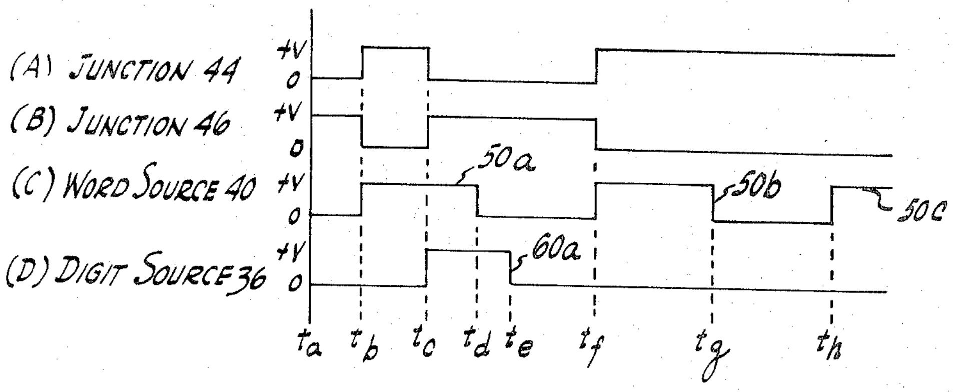
FIGURE 2 is a set of voltage waveforms useful in describing the operations of the memory element of FIGURE 1.

Assume that at a time $t_a$ the steady state of the memory element is such that the voltage at junction 44 is at ground potential (Row A, FIGURE 2). This voltage, cross-coupled to gates **16*b* and 26*b*, biases fourth transistor 20*b* "on," and biases third transistor 10*b* "off." The voltage at junction 46 is essentially +V volts (Row B, FIGURE 2). Word source 40 supplies a voltage of ground potential at input terminal 38 at this time (Row C, FIGURE 2). With +V volts at its drain 22*c* and zero volts at its gate 26*c*, fifth transistor 20*c* is biased "on" and presents a relatively low impedance cross-coupling path between junction 46 and the gates 16*a*, 26*a* of the first and second transistors 10*a* and 20*a*, whereby the +V volts at junction 46** is coupled to the latter gates.

With +V volts applied at these gates **16*a*, 26*a*, second transistor 20*a* is biased "off," first transistor 10*a* is biased "on," and the voltage at junction 44 is maintained at ground potential. The memory element may be considered to be storing a binary "1" bit of information under these conditions, i.e., when the voltages at junctions 44 and 46 are zero and +V volts, respectively. Sixth transistor 10*c* is biased off at this time by the ground potential applied at its gate 16*c*** (Row D, FIGURE 2).

Information stored in the memory element is read out selectively, and destructively, when word source 40 supplies a signal or level of +V volts at the second input terminal 38. In FIGURE 2, Row C, this signal **50*a* is shown as being applied starting at time $t_b$. The effect of raising the voltage at second input terminal 38 to +V volts is twofold. First, the input signal 50*a* biases fifth transistor 20*c* "off" to essentially open the cross-coupling path between output terminal 46 and the gates 16*a*, 26*a* of the first and second transistors. Second, raising the input voltage at second input terminal 38 turns "on" sixth transistor 10*c*, since the voltage at the gate 16*c* then is at +V volts while the voltage at the source 12*c* is at ground potential (Row D, FIGURE 2). The conduction path of sixth transistor 10*c* then has a very low impedance path, whereby the ground potential at input terminal 32 appears at the drain electrode 14*c* and also at the gates 16*a*, 26*a*** of the first and second transistors.

First transistor **10*a* turns "off" and second transistor 20*a* turns "on" when the voltage at gates 16*a* and 26*a* falls to ground potential. The voltage at junction 44 then rises to +V volts (Row A, FIGURE 2). This positive voltage, applied at the gates 16*b*, 26*b* of the third and fourth transistors, turns "off" fourth transistor 20*b* and biases "on" third transistor 10*b*. The voltage at junction 46 then falls to ground potential (Row B, FIGURE 2). Fifth transistor 20*c* remains biased off by the word signal 50*a*, whereby the voltage at output terminal 46 is not coupled through the transistor 20*c* to the gates 16*a*, 26*a*** of the first and second transistors. The memory element now is in the reset state and is storing a binary "0."

The state of the memory element prior to readout may be sampled at either of the junctions 44 or 46 by sensing for a change in voltage thereat when the word signal **50*a* is applied at $t_b$. As will become apparent as the discussion proceeds, a change in voltage occurs when the word signal 50*a* is applied only if the memory element was storing a binary "1" immediately prior to the application of word signal 50*a***. However, it is much preferable in most instances to employ current sensing, for reasons previously stated. Current sensing is accomplished as follows.

Prior to $t_b$, the voltage at the gates **16*a* and 26*a* is +V volts and the voltage at junction 44 is zero. Capacitances $C_2$ and $C_3$ are charged to V volts in the polarity direction indicated at the left side of these capacitances in FIGURE 1. Capacitances $C_1$ and $C_4$ are uncharged. When the word signal 50*a* is applied at $t_b$, the voltage at gates 16*a* and 26*a* changes from +V volts to zero, and the voltage at junction 44 changes from zero to +V volts as first transistor 10*a* turns "off" and second transistor 20*a*** turns "on." During the switching transient, capacitors $C_2$ and $C_3$ discharge and capacitances $C_1$ and $C_4$ charge to V volts in the polarity direction indicated to the right of these capacitances in FIGURE 1. The paths for the charge and discharge currents are of importance to the current sensing operation.

Current, in the conventional sense, for charging capacitance $C_1$ flows from the positive terminal of voltage source 30 through current sensor 28 and the source **22*a*–drain 24*a* path of "on" transistor 20*a* to the top plate of the capacitance $C_1$, and from the bottom plate of $C_1$ to the negative terminal of voltage source 30 via common lead 33 and circuit ground. This current is labeled "$IC_1$" in FIGURE 1. Capacitance $C_2$ discharges directly through the source 22*a*–drain 24*a* path of "on" transistor 20a. Capacitance $C_3$ discharges through the drain 14*c*–source 12*c* path of "on" transistor 10*c* and the digit source 36. Current for charging $C_4$ flows from the positive terminal of voltage source 30 and through the current sensor 28 to the top plate of $C_4$, and from the bottom plate of $C_4$, through "on" transistor 10*c*, digit source 36 and common lead 33 to ground and thence to negative terminal of voltage source 30**. This current is labeled $IC_4$ in FIGURE 1.

In summary of the above, positive charge currents $IC_1$ and $IC_4$ flow through the current sensor 28 and through the common lead 33 when the memory element is switched from the "1" state to the "0" or reset state by the word signal **50*a*. These currents are of very short duration due to the low impedance charge paths. However, the total transient current may have an appreciable amplitude. Current spikes on the order of 6 milliamperes have been measured flowing through the current sensor 28** in an actual operating circuit. The output signal provided by the current sensor 28 during the transient current may be strobed during the switching period according to well-known techniques.

The time interval $t_b$ to $t_c$ (FIGURE 2) may be designated the "read period" since the information stored in the memory element is read out during this period under control of the word source 40. Any new information to be written into the memory element may be entered during a "write" period following the read period. If it is desired to store a binary "0" bit, the digit source 36 continues to supply a voltage of ground potential at input terminal 32 during the write period. If a binary "1" bit is to be stored, digit source 36 changes state to supply a voltage of +V volts at input terminal 32. In order to enter a binary "1" bit in the memory element, word source 40 also must supply a signal of +V volts, since otherwise sixth transistor 10c would be biased "off" and the signal from the digit source 36 would not be coupled to the memory element. Word source 40, therefore, is operated during both "read" and "write," and supplies the same voltage input during both these periods. This is a distinct advantage in a memory system since the word source and logic may be of simpler construction than one of the type used in the usual memory application wherein different polarity signals are required for read and write. Also, a single signal such as 50a (Row C, FIGURE 2) can be used for both read and write, reducing the total memory time cycle.

Consider that a binary "1" bit is to be written into the memory element. At time $t_c$, the digit source 36 supplies a signal 60a of +V volts at input terminal 32 (Row D, FIGURE 2). Word source 40 also is supplying a voltage of +V volts at this time (Row C, FIGURE 2). Sixth transistor 10c then has +V volts applied at both its source 12c and its gate 16c; the drain 14c initially is at ground potential. As mentioned previously, a TFT or an MOS unit is bidirectional, and the source and drain are "interchangeable" in the sense that the "source" can operate as either the source or drain, depending on bias conditions. In such a unit, the transistor is biased "on" when the gate voltage is positive relative to the voltage at either the "source" or "drain" in an n-type transistor. Accordingly, for the input conditions in this example, sixth transistor 10c is biased "on" at $t_c$ since the gate voltage is +V volts and the "drain" is at ground potential.

With sixth transistor 10c in the "on" condition, the transistor provides a low impedance path between the gates 16a, 26a of the first and second transistors 10a and 20a and the input terminal 32. The voltage at gates 16a and 26a rises from ground potential to +V volts as the source 12c–drain 14c capacitance charges and capacitances $C_3$ and $C_4$ charge and discharge, respectively. When the +V volt value is reached, sixth transistor 10c turns "off." However, if the voltage at drain 14c should tend to fall in value, sixth transistor 10c would turn on again to maintain the drain 14c voltage at +V volts.

When the voltage at gates 16a, 26a is changed from ground potential to +V volts at $t_c$, second transistor 20a turns "off," first transistor 10a turns "on" and the voltage at junction 44 falls to ground potential (Row A, FIGURE 2). Capacitances $C_1$ and $C_2$ discharge and charge, respectively. Current flows through the current sensor 28 during the switching transient, but the output of the sensor 28 is not strobed during this period in a memory application. When the voltage at junction 44 falls to zero, third transistor 10b turns "off," fourth transistor 20b turns "on" and the voltage at junction 46 rises to +V volts (Row B, FIGURE 2). A binary "1" now is stored in the memory element. Word signal 50a terminates at $t_d$ and the voltage at the gates 26c, 16c of the fifth and sixth transistors falls to zero volts. Fifth transistor 20c then turns "on" and sixth transistor 10c is held "off." The +V volts at output terminal 46 is coupled through the low impedance conduction path of the fifth transistor 20c to the gates 16a, 26a of the first and second transistors, keeping these transistors biased "on" and "off," respectively, and maintaining the memory element in the binary "1" storage state.

Digit source 36 changes state at $t_e$ to terminate the digit signal 60a. It should be noted that word signal 50a terminates before digit signal 60a. If it did not, the voltage at input terminal 32 could fall to ground potential while the gate 16c voltage of sixth transistor 10c was at +V volts. Sixth transistor 10c would be biased "on," ground potential would be applied at the gates 16a, 26a of the first and second transistors, and the memory element would become reset, with a resulting loss of the stored information.

A second read period commences at time $t_f$ with the application of a second word signal 50b of +V volts applied at input terminal 38 (Row C, FIGURE 2). The memory element responds to this signal 50b in the same manner it responded to the first word signal 50a since a "1" is stored in the element prior to $t_f$. Briefly stated, fifth transistor 20c turns "off," sixth transistor 10c turns "on" and applies ground potential at the gates 16a and 26a of the first and second transistors 10a and 20a to turn these transistors "off" and "on" respectively. As the voltage at junction 44 rises to +V volts (Row A, FIGURE 2) third transistor 10b turns "on," fourth transistor 20b turns "off" and the voltage at junction 46 falls to ground potential (Row B, FIGURE 2). During the switching transient, capacitances $C_2$ and $C_4$ charge, the charge current flowing through the current sensor 28. The output of the sensor 28 may be strobed (by means not shown) during the transient period.

The gates 16a, 26a of the first and second transistors are at ground potential during the read period by virtue of the "on" condition of the sixth transistor 10c and the ground potential applied at input terminal 32. Assume that it is desired to store a binary "0" in the memory element during the write period. The memory element is already in the reset state and storing a binary "0." No digit signal is supplied by the digit source 36 during the write period. Consequently, sixth transistor 10c continues to furnish a low impedance path between input terminal 32 and the gates 16a, 26a, whereby the gates remain at ground potential. Word signal 50b terminates at a time $t_g$ (Row C, FIGURE 2).

The memory element now is in the reset state, and the gates 16a, 26a of the first and second transistors are at ground potential. The next read period commences at $t_h$ with the application of a word signal 50c (Row C, FIGURE 2) applied at input terminal 38 from the word source 40. Word signal 50c biases "on" sixth transistor 10c. The voltage at input terminal 32 is at ground potential at this time (Row D, FIGURE 2). However, the voltage at drain 14c of the sixth transistor 10c is already at ground potential, whereby there is no change in voltage at the gates 16a, 26a of the first and second transistors 10a and 20a. Since these latter transistors do not change operating states, there is no change in voltage at either of the junctions 44 and 46 (Rows A and B, FIGURE 2). Consequently, there is no change in the state of the charge on any of the capacitances $C_1 \ldots C_4$, and no transient charge current flows through the current sensor 28. Hence, no output signal is produced by the current sensor 28.

In summary, the application of a word signal results in a transient current flow through the current sensor only when the memory element is storing a binary "1" bit of information. Accordingly, an output signal from the sensor during the read period indicates storage of a binary "1" bit. The absence of an output signal indicates storage of a binary "0" bit. Advantage is taken of this feature in the word organized memory of FIGURE 3.

Figures 3, 4, 5:
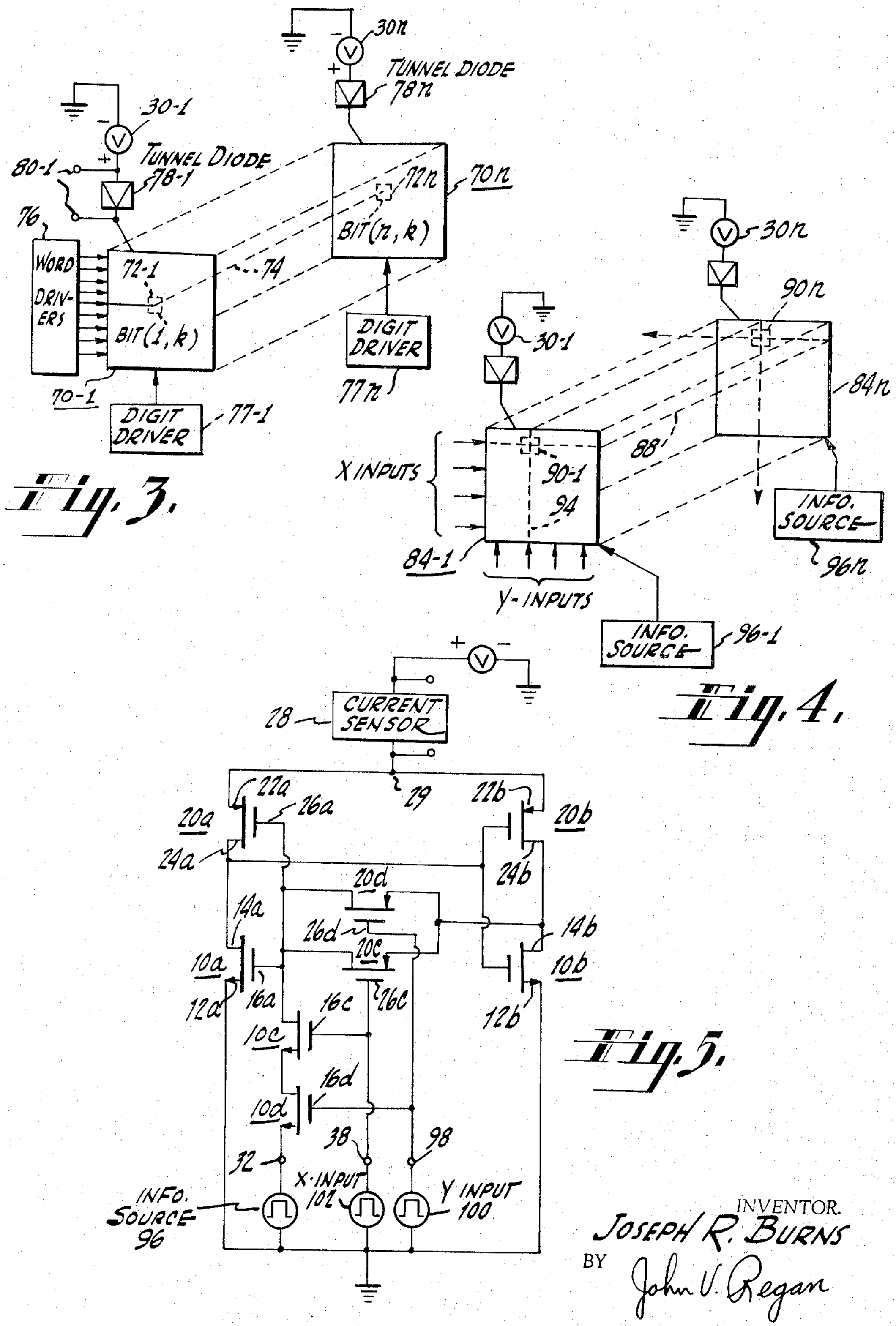
FIGURE 3 is a diagram of a word organized memory, in elementary form, that may comprise a plurality of memory elements of the type illustrated in FIGURE 1.
FIGURE 4 is a diagram, in elementary form, of a coincident voltage memory system that may comprise a plurality of the memory devices of the type illustrated in FIGURE 5.
FIGURE 5 is a schematic diagram of a coincident voltage memory element embodying the invention.

The memory of FIGURE 3 comprises a large number of memory planes, of which only the first and $n^{th}$ planes 70–1 and 70n are shown for convenience. In general, the number of planes may be equal to the number of bits in a word. Each plane has a group or array of memory elements for storing the information bits of like significance of a large number of words, and each of the different bits of a word is stored in a memory element in a different plane. For example, dashed box 72–1 in the first plane 70–1 may contain the memory element for storing the first bit of information in the $k^{th}$ word, and dashed box **72*n* in plane 70*n* may contain the memory element for storing the $n^{th}$ bit of information in the $k^{th}$ word. The other memory elements of the planes 70–1 and 70*n* are omitted for clarity of drawing, but it will be understood that each of the remaining elements in the first plane 70–1 stores the first bit of a different word, and each of the remaining elements in the plane 70*n*** stores the $n^{th}$ bit of a different word.

Each memory element is assumed to be of the type shown in FIGURE 1, except as noted hereinafter, and there may be an array of $m$-by-$m$ elements in each plane, whereby $m^2$ words may be stored in memory.

All of the memory elements, one in each plane, associated with the same word are connected to a common word line. For example, the input terminals 38 (FIGURE 1) of the memory elements for all of the bits in the $k^{th}$ word are connected to the same word line 74. This line 74, is connected to the appropriate word source or driver in box 76. The word driver performs the same function as the word source 40 in FIGURE 1, except that it is common to the memory elements for all bits of a word. All of the memory elements in any one plane are connected to a common digit source or driver. For example, all of the memory elements in the first plane 70–1 have their input terminals 32 (FIGURE 1) connected to a common digit driver 77–1.

Each memory plane 70–1 . . . **70*n* has associated therewith a separate current sensing device 78–1 . . . 78*n*, illustrated in the drawing as a tunnel diode. The junction points 29 of all of the memory elements in the first plane 70–1 are connected together and to the cathode of a common tunnel diode 78–1. Stated in another way, the sources 22*a* and 22*b* of the second and fourth transistors 20*a* and 20*b* of all memory elements in the first plane 70–1 are connected in common to the cathode of the tunnel diode 78–1, the anode of which is connected to the voltage source 30–1. The tunnel diode 78–1 is the current sensor 28 of FIGURE 1. By this arrangement, the currents flowing from B+ to ground in all of the memory elements in the first plane 70–1 flow also through the tunnel diode 78–1**. This current is very low in the steady state, being the sum of the leakage currents of the various elements. The memory elements in the other planes are similarly arranged.

A word of information is read out of memory by applying a word signal of +V volts to the word line of the desired word. For example, the $k^{th}$ word is read out of memory by conditioning the appropriate word driver to apply a signal of +V volts to word line 74. If the memory element for any bit of that word is storing a binary "1" when the word signal is applied, a transient current will flow from B+ to ground in that memory plane. This transient current, which is the charge current for the capacitances $C_1$ and $C_4$ of the element being switched, flows through the tunnel diode associated with the plane in which the memory element is located.

The tunnel diode is selected to have a current peak that is greater than the total steady state leakage current of the elements in the plane, and less than the sum of the leakage currents plus the transient current that flows when an element in the plane is switched. The total leakage current, as mentioned previously, is relatively small and may be less than the tunnel diode valley current, whereby the tunnel diode is operated monostably. In the steady state of the memory, therefore, each of the tunnel diodes is biased in an operating region of low voltage. The potential across the terminals of a tunnel diode may be of the order of a few tens of millivolts for this condition. When a memory element is reset by a word signal, the resulting transient current exceeds the peak current value of the associated tunnel diode and switches the diode temporarily to a state of high voltage. The voltage then appearing across the tunnel diode may be of the order of 400 to 800 millivolts, depending upon the type of diode, and is read out at the terminals 80–1, for example, and strobed during the read period. Any capacitance across the output terminals 80–1 may be charged and discharged rapidly at this low value of voltage through the low impedance of the tunnel diode, whereby the tunnel diode does not slow down the switching speed of the memory element.

Alternatively, the tunnel diode could be biased for bistable operation, whereby the tunnel diode, once switched, remains in a state of high voltage until reset (by means not shown). In this case, the tunnel diodes can serve the additional function of a memory register.

A memory system of the type illustrated in FIGURE 3 and comprising memory elements of the type as illustrated in FIGURE 1 has several advantages worthy of note. There is very little power dissipation in the various memory elements under steady state conditions. No output is derived from a memory element which is storing a binary "0" when the word signal is applied thereto. In a core memory, on the other hand, even a core which is storing a binary "0" generates an output signal when that core is interrogated, although the output signal has a smaller amplitude than is provided when the core is switched from the "1" to the "0" state. A further advantage of this arrangement is that the memory elements can be manufactured in integrated form with high packing density using known fabrication techniques. Moreover, the various decoders, drivers and associated logic also can be manufactured at the same time, in integrated form, and preferably on the same substrate as the memory elements themselves. A further advantage is the fact that only a single read/write word pulse is required in the FIGURE 3 arrangement, whereas in a core type memory separate read and write word pulses of opposite polarity generally are required.

One feature of the FIGURE 3 arrangement which may be a disadvantage in some cases is that a separate word line is required for each word of storage. For example, if each plane has an $m$-by-$m$ array of memory elements, $m^2$ word lines are required for each plane, the like word lines of the separate planes being connected together. If the array is large, it may be difficult or undesirable to provide the large number of word lines. This problem may be obviated by an arrangement of the type illustrated in FIGURE 4.

The arrangement of FIGURE 4 is a coincident voltage memory employing $x$ and $y$ coordinate selection analogous to a coincident current core memory. Only two planes 84–1 and **84*n* of the memory are illustrated for convenience. Let it be assumed that each plane has an $m$-by-$m$ array of memory elements, the same as in the case of the FIGURE 3 arrangement. There is provided a separate $x$ input line for each row of memory elements, for a total of $m$ row lines, and each $x$ input line is common to all of the memory elements in the same numbered row in all of the planes. There is also a separate $y$ input line for each column of memory elements, or a total of $m$, and each $y$ input line is common to all of the memory elements in the same numbered column in all of the planes. For example, let the dashed box 90–1 in the first plane 84–1 contain the memory element at the intersection of the $a^{th}$ row and $b^{th}$ column of the first plane 84–1. Let the dashed box 90*n* contain the memory element at the intersection of the $a^{th}$ row and $b^{th}$ column of plane 84*n*. As shown in the drawing, the $x$ input line 88 is common to both of these elements, as is the $y$ input line 94**. The total number of $x$ and $y$ input lines is $2m$, as contrasted to the $m^2$ lines required in the system of FIGURE 3.

The information stored in a memory element is read out when signals are applied on both of the $x$ and $y$ lines common to that element. A binary "1" bit of information is written into a memory element by energizing the information source for the memory plane containing that element while signals are present on both of the $x$ and $y$ lines common to that element. For example, the word stored in the group of memory elements that includes elements 90–1 and 90$n$ is read out by applying signals concurrently to the $x$ and $y$ input lines 88 and 94. A binary "1" bit is written into the element 90–1 by energizing information sources 96–1 during the write period when lines 88 and 94 are receiving input signals.

FIGURE 5 is a schematic drawing of a memory element of the voltage coincident type suitable for use in the arrangement of FIGURE 4. This memory element is similar generally to the memory element of FIGURE 1, wherefore only the differences need be noted. In FIGURE 5, a seventh insulated-gate field-effect transistor 20$d$ of p-type conductivity has its conduction path connected in parallel with the conduction path of fifth transistor 20$c$, and has its gate 26$d$ connected to an input terminal 98. An eighth insulated-gate field-effect transistor 10$d$ of n-type conductivity has its conduction path connected in series with the conduction path of sixth transistor 10$c$ between input terminal 32 and the gates 16$a$, 26$a$ of the first and second transistors 10$a$, 20$a$. The gate 16$d$ of the eighth transistor 10$d$ is connected to the input terminal 98. The signal source 102, connected between input terminal 38 and ground, and the signal source 100, connected between input terminal 98 and ground, supply the $x$ and $y$ input signals, respectively, for the memory element.

The operation of the FIGURE 5 circuit is similar generally to the operation of the FIGURE 1 circuit, except for the following differences. In order to read out the information stored in the memory element, both the $x$ and $y$ input sources 102 and 100 must supply input signals. These input signals, which switch the voltages at terminals 38 and 98, respectively, from ground potential to +V volts, bias off the fifth and seventh transistors 20$c$ and 20$d$ to "open" the cross-coupling path from the drains 14$b$ and 24$b$ of the third and fourth transistors to the gates 16$a$, 26$a$ of the first and second transistors. The signals supplied by sources 102 and 100 also bias "on" the sixth and eighth transistors 10$c$, 10$d$, respectively. A low impedance path then is provided through transistors 10$c$ and 10$d$ between input terminal 32 and the gates 16$a$, 26$a$ of the first and second transistors to reset the memory element in the manner described in connection with the FIGURE 1 memory element.

To write a binary "1" bit of information into the memory element during the write period, the information source 96 supplies a signal of +V volts at input terminal 32 while the $x$ and $y$ input sources 102 and 100 are supplying input signals of +V volts. If only one of the latter sources is supplying an input signal, then only one of the sixth and eighth transistors 10$c$, 10$d$ is biased on. The other one of these transistors is biased "off," whereby the memory element cannot be reset during the read period, and new information cannot be written into the memory element during the write period. Hence the term "coincident voltage" memory element.

Various modifications may be made in the memory elements illustrated in FIGURE 1 and FIGURE 5 without departing from the spirit of the invention. For example, n-type transistors may be substituted for the p-type transistors illustrated, and p-type transistors may be substituted for the n-type transistors, provided that the connections to the bias source 30 and current sensor 28 are reversed and provided also that the polarities of the digit and word signals are reversed. Also, the voltage levels may be changed by grounding the drain electrodes 22$a$, 22$b$ of the second and fourth transistors 20$a$, 20$b$ and connecting the bias source 30 between circuit ground and the sources 12$a$, 12$b$ of the first and third transistors 10$a$, 10$b$, with suitable change in the input signal levels.

What is claimed is:

1. The combination comprising:

a plurality of insulated-gate field-effect devices each having first and second electrodes defining the ends of a conduction path and a control electrode;

first and third ones of said devices being of one conductivity type, and second and fourth ones being of the opposite conductivity type;

the first and second devices having their conduction paths serially connected between a point of voltage of a first value and a point of voltage of a second value;

the third and fourth devices having their conduction paths serially connected between a point of voltage of said first value and a point of voltage of said second value;

means connecting the control electrode of the first device to the control electrode of the second device;

means connecting the control electrode of the third device to the control electrode of the fourth device;

means connected between the junction of the conduction paths of the first and second devices and a point common to the control electrodes of the third and fourth devices;

a fifth one of said devices having its conduction path connected between the junction of the conduction paths of the third and fourth devices and a point common to the control electrodes of the first and second devices;

an input terminal;

a sixth one of said devices having its conduction path connected between said input terminal and a point common to the control electrodes of said first and second devices;

first signal input means connected to the control electrodes of the fifth and sixth devices; and second signal input means connected at said input terminal.

2. The combination comprising:

a plurality of insulated-gate field-effect devices each having first and second electrodes defining the ends of a conduction path and a control electrode;

first, third and sixth ones of said devices being of one conductivity type and second, fourth and fifth ones of said devices being of the opposite conductivity type;

first and second junction points;

the first and second devices having their conduction paths serially connected between said first and second junction points;

the third and fourth devices having their conduction paths serially connected between said first and second junction points;

means connecting the control electrode of the first device to the control electrode of the second device;

means connecting the control electrode of the third device to the control electrode of the fourth device;

means connected between the junction of the conduction paths of the first and second devices and a point common to the control electrodes of the third and fourth devices;

the fifth device having its conduction path connected between the junction of the conduction paths of the third and fourth devices and a point common to the control electrodes of the first and second devices;

an input terminal;

the sixth device having its conduction path connected between said input terminal and a point common to the control electrodes of said first and second devices;

first signal input means connected to the control electrodes of the fifth and sixth devices;

second signal input means connected at said input terminal;
a current sensing device having one terminal connected to one of said first and second junctoin points; and
means for applying operating potential between the other terminal of said current sensing device and the other one of said first and second junction points.

3. The combination comprising:
a plurality of insulated-gate field-effect transistors each having first and second electrodes defining the ends of a conduction path and a control electrode;
first, third and sixth ones of said transistors being of one conductivity type and second, fourth and fifth ones of said transistors being of the opposite conductivity type;
the first and second transistors having their conduction paths serially connected, in the order named, between a point of voltage of a first value and a point of voltage of a second value;
the third and fourth transistors having their conduction paths serially connected, in the order named, between a point of voltage of said first value and a point of voltage of said second value;
negligible impedance means connected between the control electrodes of the first and second transistors;
negligible impedance means connected between the control electrodes of the third and fourth transistors;
negligible impedance means connected between the junction of the conduction paths of the first and second transistors and the control electrodes of the third and fourth transistors;
the fifth transistor having its conduction path connected between the junction of the conduction paths of the third and fourth transistors and the control electrodes of the first and second transistors;
an input terminal;
the sixth transistor having its conduction path connected between said input terminal and the control electrodes of said first and second transistor;
means connected to the control electrodes of the fifth and sixth transistors for switching the voltage thereat selectively from said first value to said second value; and
means connected at said input terminal for selectively switching the voltage thereat from said first value to said second value after the voltage at the control electrodes of said fifth and sixth transistors has been switched from said first value to said second value.

4. The combination comprising:
a plurality of insulated-gate field-effect transistors each having first and second electrodes defining the ends of a conduction path and a control electrode;
first, third, seventh and eighth ones of said transistors being of one conductivity type and second, fourth, fifth and sixth ones of said transistors being of the opposite conductivity type;
the first and second transistors having their conduction paths serially connected between a point of voltage of a first value and a point of voltage of a second value;
the third and fourth transistors having their conduction paths serially connected between a point of voltage of said first value and a point of voltage of said second value;
negligible impedance means connecting the control electrodes of the first and second transistors;
negligible impedance means connecting the control electrodes of the third and fourth transistors;
negligible impedance means connected between the junction of the conduction paths of the first and second transistors and the control electrodes of the third and fourth transistors;
the fifth transistor having its conduction path connected between the junction of the conduction paths of the third and fourth transistors and the control electrodes of the first and second transistors;
the sixth transistor having its conduction path connected in parallel with the conduction path of said fifth transistor;
an input terminal;
the seventh and eighth transistors having their conduction paths serially connected between said input terminal and the control electrodes of the first and second transistors;
means connected to the control electrodes of the fifth and seventh transistors for selectively switching the voltage thereat from said first value to the second value;
means connected to the control electrodes of the sixth and eighth transistors for selectively switching the voltage thereat from said first value to said second value; and
means connected at said input terminal for selectively switching the voltage thereat from said first value to said second value.

5. The combination comprising:
a plurality of insulated-gate field-effect transistors each having a source and a drain defining the ends of a conduction path and a gate for controlling the impedance of said conduction path;
first, third and sixth ones of said transistors being of one conductivity type and second, fourth and fifth ones of said transistors being of the opposite conductivity type;
the first and second transistors having their drains directly connected together and having their sources respectively connected to first and second points of different operating potential;
the third and fourth transistors having their drains connected together and having their respective sources connected to said first and second points of different operating potential;
current responsive means connected between said first and second points;
negligible impedance means connecting the gates of the first and second transistors;
negligible impedance means connecting the gates of the third and fourth transistors together and to the drains of the first and second transistors;
the fifth transistor having its conduction path connected between the drains of the third and fourth transistors and the gates of the first and second transistors;
a first input terminal;
the sixth transistor having its conduction path connected between said first input terminal and the gates of said first and second transistors;
a second input terminal common to the gates of said fifth and sixth transistors;
first input means connected to the second input terminal for selectively switching the conduction path impedances of the fifth and sixth transistors from relatively low and relatively high values, respectively, to relatively high and relatively low values, respectively; and
second input means connected at said first input terminal.

6. The combination comprising:
a plurality of enhancement type insulated-gate field-effect transistors each having a source and a drain defining the ends of a conduction path and a gate for controlling the impedance of the conduction path;
first, third and sixth ones of said transistors being of one conductivity type and second, fourth and fifth ones of said transistors being of the opposite conductivity type;
said first and second transistors having their drains connected together and having their respective sources connected to a point of voltage of a first value and a point of voltage of a second value, respectively;

said third and fourth transistors having their drains connected together and having their respective sources connected to a point of voltage of said first value and a point of voltage of said second value, respectively;

negligible impedance means connecting the gates of the first and second transistors;

negligible impedance means connecting the gates of the third and fourth transistors together and to the drains of the first and second transistors;

the fifth transistor having its conduction path connected between the drains of the third and fourth transistors and the gates of the first and second transistors;

an input terminal;

the sixth transistor having its conduction path connected between said input terminal and a point common to the gates of said first and second transistors;

first input means connected to the gates of the fifth and sixth transistors for switching the voltage thereat selectively from a voltage of approximately said first value to a voltage of approximately said second value; and second input means connected at said input terminal for selectively switching the voltage thereat from a voltage having approximately said first value to a voltage having approximately said second value.

7. The combination as claimed in claim 6 including a seventh transistor of said opposite conductivity type having its conduction path connected in parallel with the conduction path of said fifth transistor; an eighth transistor of said one conductivity type having its conduction path connected in series with the conduction path of said sixth transistor; and means connected to the gates of the seventh and eighth transistors for selectively switching the voltages thereat from said first value to said second value.

8. The combination comprising:

a plurality of semiconductor devices of one conductivity type and a plurality of semiconductor devices of the opposite conductivity type each having first and second electrodes defining the ends of a conduction path and a control electrode that conducts negligible current under steady state input conditions;

a first device of said one conductivity type and a second device of said opposite conductivity type having their conduction paths connected in a first series circuit;

a third device of said one conductivity type and a fourth device of said opposite conductivity type having their conduction paths connected in a second series circuit;

negligible impedance means connecting the control electrode of the first device to the control electrode of the second device;

negligible impedance means connecting the control electrodes of the third and fourth devices together and to a point on the first series circuit between the conduction paths of the first and second devices;

a fifth device of said opposite conductivity type having its conduction path connected between a point on the second series circuit between the conduction paths of the third and fourth devices and a point common to the control electrodes of the first and second devices;

an input terminal;

a sixth device of said one conductivity type having its conduction path connected between said input terminal and said point common to the control electrodes of said first and second devices;

first signal input means connected in common to the control electrodes of the fifth and sixth devices; and second signal input means connected at said input terminal.

9. The combination as claimed in claim 8 including a current responsive device connected in common to each of the first and second series circuits and in series therewith.

10. The combination comprising:

first, third and sixth semiconductor devices of one conductivity type each having first and second electrodes defining the ends of a conduction path and a control electrode that conducts negligible current under steady state input conditions, each of said devices having the characteristic that the impedance of its conduction path has a relatively high value when the voltage applied at its control electrode relative to the voltages at its first and second electrodes has a first value and having a relatively low value when the voltage applied at its control electrode relative to the voltage at one of its first and second electrodes has a second value;

second, fourth and fifth semiconductor devices of the opposite conductivity type differing operationally from the devices of said one conductivity type in that the impedance of the conduction path of a device of said opposite conductivity type has a relatively low value when the voltage at its control electrode relative to the voltage at one of its first and second electrodes has said first value and has a relatively high value when the voltage applied at its control electrode relative to the voltage at both of said first and second electrodes has said second value;

said first and second devices having their conduction paths connected in series between a point of voltage of said first value and a point of voltage of said second value;

said third and fourth devices having their conduction paths connected in series between a point of voltage of said first value and a point of voltage of said second value;

means directly connecting the control electrode of the first device to the control electrode of said second device;

means directly connecting the control electrode of the third device to the control electrode of said fourth device and to a point common to the conduction paths of the first and second devices;

the fifth semiconductor device having its conduction path connected between the junction of the conduction paths of the third and fourth devices and a point common to the control electrodes of the first and second devices;

an input terminal;

the sixth semiconductor device having its conduction path connected between said input terminal and a point common to the control electrodes of the first and second devices;

means connected to the control electrodes of the fifth and sixth devices for selectively switching the voltage thereat from said first value to said second value; and means connected to said input terminal for selectively changing the voltage thereat from said first value to said second value while the voltage at the control electrodes of the fifth and sixth devices has said second value.

11. The combination as claimed in claim 10 including a seventh semiconductor device of said opposite conductivity type having its conduction path connected in parallel with the conduction path of said fifth device; an eighth semiconductor device of said one conductivity type having its conduction path connected in series with the conduction path of said sixth device between said input terminal and the control electrodes of said first and second devices; and means connected to the control electrodes of the seventh and eighth devices for selectively switching the voltage thereat from said first value to said second value.

12. The combination comprising:

a plurality of bistable memory elements each including a pair of n-type and a pair of p-type insulated-gate field-effect transistors cross-coupled in a complementary symmetry arrangement;
each of said memory elements having first and second stable states;
a like plurality of signal input means each connected to an input of a different one of said memory elements and being selectively and individually operable to switch the associated memory element to the first stable state;
a current responsive device; and
a source of operating potential connected in common to all of said memory elements through said current responsive device.

13. The combination comprising:
a plurality of memory elements, each of said elements including: a plurality of field-effect transistors each having a source and a drain defining the ends of a conduction path, and an insulated gate; first, third and sixth ones of said transistors being of one conductivity type and second, fourth and fifth ones of said transistors being of the opposite conductivity type; said first and second transistors having their conduction paths serially connected in a first branch circuit with their drains connected together; said third and fourth transistors having their conduction paths serially connected in a second branch circuit; first means connecting the gates of the first and second transistors; second means connecting the gates of the third and fourth transistors; third means coupling the drains of the first and second transistors to a point common to the gates of the third and fourth transistors; the fifth transistor having its conduction path connected between a point common to the drains of the third and fourth transistors and a point common to the gates of the first and second transistors; a first input terminal; the sixth transistor having its conduction path connected between said first input terminal and a point common to the gates of the first and second transistors; and a second input terminal common to the gates of said fifth and sixth transistors;
a common current responsive device connected in series with the first and second circuit branches of all of said plurality of memory elements;
a likely plurality of first signal input means each connected to the second input terminal of a different one of said memory elements, each of said first signal input means being individually operable; and
a second signal input means connected in common to the first input terminal of each of said plurality of memory elements.

14. The combination as claimed in claim 13, wherein each of said first, second and third means has a negligible impedance.

15. The combination as claimed in claim 13, wherein said second signal input means is operable to supply an input signal only when one of said first signal input means is supplying an input signal.

16. The combination as claimed in claim 13, wherein each of said memory elements also includes a seventh transistor of said opposite conductivity type having its conduction path connected in parallel with the conduction path of said fifth transistor, an eighth transistor of said one conductivity type having its conduction path connected in series with the conduction path of said sixth transistor between said first input terminal and a point common to the gates of said first and second transistors, and a third input terminal common to the gates of the seventh and eighth transistors; and a plurality of independently operable third signal input means each connected to the third input terminal of a different one of said memory elements.

17. The combination comprising:
a plurality of insulated-gate field-effect transistors each having a source and a drain defining the ends of a conduction path, and a gate for controlling the impedance of the conduction path;
means for applying input signals selectively at the gates of different ones of said transistors;
a plurality of circuit branches connected in parallel and each including the conduction paths of a different pair of said transistors connected in series;
a current operated switching device;
output means coupled to said switching device; and
means for applying operating potential across said branch circuits through said current operated switching device.

18. The combination comprising:
first, second and third insulated-gate field-effect transistors each having a source, a drain and a gate;
first and second circuit branches connected in parallel, the first branch including the source-drain path of the first transistor and the second branch including the source-drain path of the second transistor;
means cross-coupling the drains of the first and second transistors to the gates of the second and first transistors, respectively;
an input terminal;
means connecting the source-drain path of the third transistor between said input terminal and the gate of the first transistor;
means for connecting said input terminal to a source of input signals; and
means for connecting the gate of the third transistor to a source of control voltage.

19. The combination as claimed in claim 18, including a fourth insulated-gate field-effect transistor having its source-drain path connected in the cross-coupling loop between the drain of the second transistor and the gate of the first transistor, and means for connecting the gate of the fourth transistor to a source of control voltage.

20. The combination as claimed in claim 19, wherein the third and fourth transistors are of opposite conductivity types and wherein the gates of the third and fourth transistors are connected together.

21. A memory comprising:
a plurality of groups of memory elements, each memory element including: an insulated-gate field-effect transistor flip-flop having an input point, and an insulated-gate field-effect input transistor having a gate connected to the input point, a source and a gate;
a like plurality of control lines, one for each of said groups of memory elements;
a plurality of signal input lines;
means connecting the gates of all input transistors in the same group to the control line associated with that group; and
means connecting the source of each input transistor of a said group to a different one of said signal input lines.

22. A memory as claimed in claim 21, wherein each said memory element includes first and second insulated-gate field-effect transistors, means cross-coupling the drains of the first and second transistors to the gates of the second and first transistors, respectively, and wherein the drain of the input transistor of the memory element is coupled to the gate of one of said first and second transistors thereof.

23. A memory as claimed in claim 21, wherein each said memory element includes first and second insulated-gate field-effect transistors of one conductivity type and third and fourth insulated-gate field-effect transistors of a second, opposite conductivity type; means connecting the source-drain paths of the first and third transistors in series with each other, drain-to-drain, in a first circuit branch; means connecting the source-drain paths of the second and fourth transistors in series with each other, drain-to-drain, in a second circuit branch; means coupling the gates of the first and third transistors together and to the drains of the second and fourth transistors; means coupling the gates of the second and fourth transistors together and to drains of the first and third transistors; and means coupling the drain of the input transistor for the memory element to a point common to the gates of the first and third transistors.

24. The combination comprising:

first, second, third and fourth insulated-gate field-effect transistors each having a source, a drain and a gate;

first and second circuit branches connected in parallel, the first branch including the source-drain path of the first transistor and the second circuit branch including the source-drain path of the second transistor;

means cross-coupling the drains of the first and second transistors to the gates of the second and first transistors, respectively;

an input terminal;

means connecting the source-drain paths of the third and fourth transistors in series between said input terminal and the gate of the first transistor;

a first control input terminal coupled to the gate of the third transistor; and a second control input terminal coupled to the gate of the fourth transistor.

25. The combination as claimed in claim 24, including a first source of control voltage connected at the first control input terminal, a second source of control voltage connected at the second control input terminal and a source of input signals connected at said input terminal, wherein each of the first and second control voltage sources selectively provides an output of either a first value to bias its associated transistor in the "off" state, or a second value sufficient to bias its associated transistor in the "on" state.

26. The combination as claimed in claim 24, wherein the first and second transistors are of one conductivity type, and including fifth and sixth transistors of the opposite conductivity type having their source-drain paths connected in series with the source-drain paths of the first and second transistors, respectively, and means connecting the gates of the fifth and sixth transistors to the gates of the first and second transistors, respectively.

References Cited

UNITED STATES PATENTS

| | | | |
|---|---|---|---|
| 3,168,649 | 2/1965 | Meyers | 307—88.5 |
| 3,191,061 | 6/1965 | Weimer | 307—88.5 |
| 3,213,299 | 10/1965 | Rogers | 307—88.5 |
| 3,222,610 | 12/1965 | Evans et al. | 330—38 |

OTHER REFERENCES

RCA Technical Notes No. 569 (1 sheet) March 1964, "Insulated-Gate Field Effect Transistor Limiter Amplifier," by R. S. Tipping et al.

Technical Notes, Amelco Semiconductor, Division of Teledyne, Inc., "Cascode Field Effect Transistor Applications," Oct. 31, 1963, p. 11 relied on.

ARTHUR GAUSS, *Primary Examiner.*

J. ZAZWORSKY, *Assistant Examiner.*